United States Patent [19]

Liggat

[11] Patent Number: 5,693,389
[45] Date of Patent: Dec. 2, 1997

[54] POLYESTER COMPOSITION

[75] Inventor: John Jamieson Liggat, Glasgow, United Kingdom

[73] Assignee: Zeneca Limited, London, England

[21] Appl. No.: 553,412

[22] PCT Filed: May 20, 1994

[86] PCT No.: PCT/GB94/01095
  § 371 Date: Apr. 17, 1996
  § 102(e) Date: Apr. 17, 1996

[87] PCT Pub. No.: WO94/28070
  PCT Pub. Date: Dec. 8, 1994

[30] Foreign Application Priority Data

May 24, 1993 [GB] United Kingdom ............... 9310712.6

[51] Int. Cl.$^6$ .................... B29D 22/00; B28B 3/20; C08G 63/48
[52] U.S. Cl. .............. 428/35.7; 525/54.4; 525/450; 528/361; 264/176.1; 264/212; 264/239; 264/291; 264/299; 264/331.11; 264/540; 428/35.7
[58] Field of Search ................. 525/54.4, 450; 528/361; 264/540, 176.1, 212, 239, 291, 299, 331.11; 428/35.7

[56] References Cited

FOREIGN PATENT DOCUMENTS

| 533 314 | 3/1993 | European Pat. Off. |
| 92 09210 | 6/1992 | WIPO. |
| 94 11440 | 5/1994 | WIPO. |

OTHER PUBLICATIONS

ORGAN, et al: "Phase separation in a blend of poly (hydroxybutyrate) with poly (hydroxybutyrate-co-hydroxyvalerate)", POLYMER, vol. 34, No. 3, Feb. 1993, pp. 459–467, see figures 10,13C,13E.

*Primary Examiner*—Samuel A. Acquah
*Attorney, Agent, or Firm*—Cushman Darby & Cushman IP Group Pillsbury Madison & Sutro LLP

[57] ABSTRACT

A polyester composition comprises at least one first semi-crystalline or crystallizable polyhydroxyalkanoate (PHA-X) and at least one second polyhydroxyalkanoate (PHA-Y) in semi-crystalline or crystalline form and having a higher crystalline melting point than said PHA-X. The PHA-Y is prepared by an annealing treatment in which the crystalline melting point is raised preferably by at least 5° C. compared to the PHA-X and preferably by at least 3° C. compared to the PHA-Y prior to the annealing treatment. The PHA-X and PHA-Y are preferably selected from polyhydroxybutyrate and polyhydroxybutyrate-co-valerate.

10 Claims, No Drawings

POLYESTER COMPOSITION

This application claims benefit of international application PCT/GB94/01095, filed May 20, 1994.

This invention relates to a polyester composition and to modified polyesters useful as components thereof.

Poly-3-hydroxybutyrate (PHB) has the disadvantage of being brittle especially when melt cast. The apparent reason for this brittleness is the presence of large spherulites in the polymer. Such large spherulites frequently have cracks which open up under little extra strain and produce brittle failure of the sample (Barham P. J., Keller, A., Journal of Polymer Science Vol 24, p69–77 1986). One way of increasing the ductility of PHB is to nucleate the melt with small particles which reduces the spherulite size thereby producing major benefits in the mechanical properties of the polymer. Another benefit from nucleation is faster crystallisation and thus reduced processing times. A commonly used nucleant is boron nitride but is an expensive material and is not biodegradable. Alternative less expensive sources of nucleant and biodegradable nucleants are therefore desirable.

Thus, according to the invention in its first aspect there is provided a polyester composition comprising at least one first semi-crystalline or crystallisable polyhydroxyalkanoate (PHA-X) and at least one second polyhydroxyalkanoate (PHA-Y) in semi-crystalline or crystalline form and having a higher crystalline melting point than said PHA-X.

In the present context the terms crystalline, semi-crystalline and crystallisable have the following meanings: crystalline means 100% crystalline, semi-crystalline means polymer which has a crystalline content but is not 100% crystalline, and crystallisable means polymer which is capable of crystallising including polymer materials in the amorphous state.

The polyester composition may comprise at least one microbiologically produced polyester or at least one synthetically produced polyester.

In one form of the composition the crystalline melting point of PHA-Y is higher by at least 5° C., especially 10° to 50° C., than that of the PHA-X. Typically the amount of PHA-Y contained in the PHA-X is sufficient to nucleate the PHA-X in melt processing, that is, to decrease its crystallisation time.

The invention particularly includes a two-phase composition when at a temperature at or above the crystalline melting point of the molten PHA-X but below that of the solid PHA-Y.

The PHA-X and PHA-Y are polymers capable of a relatively high level of crystallinity, for example over 30%, especially 50–90%, in the absence of plasticiser. Suitably the composition may include polyester having units of formula I:

where m is in the range 1–13 and n is 2 m or (if m is at least 2) 2m–2. Typically $C_mH_n$ contains 2–5 carbon atoms in the polymer chain and the remainder (if any) in a side chain. In very suitable polyesters m is 3 or 4, n is 2 m and especially there are units with m=3 and m=4 copolymerised together and with respectively a $C_1$ and $C_2$ side chain on the carbon next to oxygen in the chain. Particular polyesters contain a preponderance of m=3 units, especially with at least 70 mol % of such units, the remainder being units in which m =4.

In the following description the crystalline melting point $T_m$ and heat of fusion $\Delta H_f$ are determined by Differential Scanning Calorimetry (DSC). $T_m$ is the peak of the curve of dH/dt against temperature. $\Delta H_f$ is the area under that curve.

The molecular weight (Mw) of PHA-X is preferably over 200000, up to for example, $2 \times 10^6$. The Mw of the PHA-Y can be of the same order as that of the PHA-X.

The polyhydroxyalkanoate is preferably polyhydroxybutyrate (PHB) or polyhydroxybutyrate-co-valerate (PHBV), which may be 3-hydroxy or 4-hydroxy or a mixture of both. Especially preferred are the 3-hydroxy forms of PHB and PHBV.

The PHA-X may be PHB homopolymer or PHBV co-polymer as demonstrated by (a) below, or a blend of two or more polymers differing in the value of m, for example, a blend of homopolymer and copolymer or a blend of two copolymers. An example of a blend of two copolymers contains (a) PHA consisting essentially of Formula I units in which 2–5 mol % of units have m=4, the rest m=3; and (b) PHA consisting essentially of Formula I units in which 5–30 mol % of units have m=4, the rest m=3. In each such PHA there are side chains as above mentioned.

The proportions of the polymers in such blends are preferably such as to give an average m=4 content in the range 4–20 mol %.

In the PHA-X or -Y having units with m=3 and/or m=4 there may be very small, typically fractional, percentages of units having higher values of m.

The repeating units of the PHA-Y can be the same as or different from those of the PHA-X. The PHA-Y may contain up to 5 mol % of units other than PHB. Preferably the PHA-Y contains less than 2 mol %, especially less than 0.5 mol % of units other than polyhydroxybutyrate (Formula I, m=3, methyl side chain on carbon next to oxygen). PHB homopolymer is particularly preferred as PHA-Y.

The PHA-Y preferably has a crystalline melting point higher by for example at least 3° C., preferably 3° C. to 15° C., especially by 6° C. to 12° C., than PHA-Y as recovered from microorganism cells by known procedures not involving treatment at temperatures over $(T_m$ minus 20)° C. Thus when the PHA-Y is PHB homopolymer its crystalline melting point is at least 177° C., especially in the range 180° C. to 183° C. The PHA-Y has a distinct single $T_m$ and percentage crystallinity is preferably over 75° C., especially in the range 80°–90° C., making it only slowly soluble in chloroform. If PHA-Y is prepared by crystallisation from a solvent the PHA-Y could be 100% crystalline (Barbara P. J., Keller A., Otun E. L., Holmes P. A., Journal of Material Science, 1984, Vol 19, p2781–94; H. Mitomo, P. J. Barham, A. Keller, Polymer Journal 1987, Vol 19, p1241–1253).

The PHA-Y of the present invention acts a nucleant in the polymer composition. Preferably the composition contains from 0.1 to 20% w/w of the composition as PHA-Y, more preferably 1 to 10%. When the PHA-Y is provided in powdered form the size of the PHA-Y particles is not critical but it will be appreciated that the smaller the particles the greater the number of nucleating sites. The particles are preferably from 5 to 500 μm.

The PHA can be a fermentation product, especially of a microbiological process in which a microorganism lays down PHA during normal growth or is caused to do so by cultivation in the absence of one or more nutrients necessary for cell multiplication. The microorganism may be wild or mutated or may have the necessary genetic material introduced into it. Alternatively the necessary genetic material may be harboured by an eukaryote, to effect the microbiological process. Examples of suitable microbiological processes are the following:

for Formula I material with m=3 or m=partly 3, partly 4: EP-A-69497 (Alcaligenes eutrophus);

for Formula I material with m=3: U.S. Pat. No. 4,101,533 (A. eutrophus H-16), EP-A-144017 (A. latus); for Formula I material with m=7–13: EP-A-0392687 (various Pseudomonas).

Alternately, PHB and PHBV can be a product of synthetic chemistry (Bloembergen, S. and Holden, D. A., Macromolecules. 1989, 22 p1656–1663. Bloembergen, Holden, Bluhm, Hamer and Marchessault, Macromolecules 1989, 22, p1663–1669).

The invention provides also methods of making the composition by mixing its components together in conditions preserving the crystal lattice of the PHA-Y. This may involve simply mixing dry powders, slurrying or spray drying, one or both of which is conveniently polyester particles as laid down by microorganisms or clusters of such polyester particles.

The methods include also intensive mixing of the PHA-X and PHA-Y, for example by passage through an extruder. They also include mixing in the melt. In each such operation the temperature is kept below the crystalline melting point of the PHA-Y. The extrudate or solidified melt may be a final shaped product or may be cut to chip or ground to powder as feed for a shaping operation such as extrusion or injection moulding. Normally solvents are not used as a method for mixing PHA-X and PHA-Y but, if used, should be such as do not dissolve PHA-Y.

In a further method a mixture comprising PHA-X and PHA-Y is melted completely, then held at a temperature between the crystalline melting points of PHA-X and PHA-Y until at least part of the PHA-Y has crystallised. This creates in-situ nucleation events.

The invention in its second aspect provides such PHA-Y per se, which has been subjected to an annealing treatment such that the crystalline melting point of the PHA-Y is higher by at least 3° C. than the crystalline melting point of the PHA-Y prior to the annealing treatment.

Further, the invention provides a process for preparing polyhydroxyalkanoate (PHA-Y) which comprises subjecting the PHA-Y to an annealing treatment in which the PHA-Y is heated to 1° to 10° C. below the crystalline melting point for a period sufficient to raise the crystalline melting point by at least 3° C. above the crystalline melting point of the PHA-Y prior to the annealing treatment.

The temperature of the annealing treatment is preferably 1° to 5° C. below the crystalline melting point, especially 2° to 3° C. below the crystalline melting point. The period of the treatment is preferably long enough to raise the crystalline melting point until the crystalline melting point ceases to rise but preferably by at least 3° C. and particularly 3° C. to 15° C., especially 6° C. to 12° C. This period is preferably anywhere from 10 minutes to 12 hours, particularly 1 to 8 hours.

The annealing treatment may be carried out in presence of oxygen, in a vacuum, or in an inert atmosphere such as nitrogen.

The PHA-Y is suitably in the above mentioned fine particulate form but could be subjected to the annealing treatment in the molten form. Such PHA-Y may contain a small proportion, for example up to 5% w/w of cellular debris, as commonly present in PHA recovered by removal of cell material. For better colour stability it contains less than 1% of such debris, and is preferably the product of washing polymer granules with a water-miscible organic liquid, for example, methanol, ethanol, acetone, butanol, or is the product of extraction from the cells by means of a water-insoluble solvent for the PHA.

The PHA-X may contain any of the usual polymer processing additives such as plasticisers, fillers, fibres and pigments.

For the ratio of such plasticiser to PHA the range up to 40 phr w/w includes most of the likely uses and, for making effectively rigid but not brittle articles the range 5–20 phr w/w is generally suitable.

Examples of suitable plasticisers are (a) high-boiling esters of polybasic acids, such as phthalates, isophthalates, citrates, fumarates, glutamates, phosphates or phosphites. The esterified radicals may be for example $C_1$–$C_{12}$ alkyl, aryl, aralkyl or aralkyl. Particular examples are dioctyl-, dibaptyl- and dirindecyl- phthalates and dialkylalkylene oxide glutamate (Plasthall 7050);

(b) high-boiling esters and part- of polyhydric alcohols, especially glycols, polyglycols and glycerol. The acid-derived radical of the ester typically contains 2–10 carbon atoms. Examples are triacetin, diacetin and glycerol dibenzoate;

(c) aromatic sulphonamides such as paratoluenesulphonamide

Particular examples of such plasticisers are esters of polyhydric alcohols, for example glyceryl esters of $C_1$–$C_4$ carboxylic acids. Generally it is preferred that the plasticiser should be biodegradable.

A particularly preferred plasticiser is a doubly esterified hydroxycarboxylic acid having at least 3 ester groups in its molecule.

"Doubly esterified" means that at least some of the hydroxy groups of the hydroxycarboxylic acid are esterified with a carboxylic acid and at least some of the carboxy groups thereof are esterified with an alcohol or phenol. Preferably at least the hydroxycarboxylic acid from which the ester is derived is aliphatic or cycloaliphatic. Its backbone structure (that is, apart from carboxy groups) preferably contains 2–6 carbon atoms. It contains preferably 2–4 carboxy groups and 1–3 hydroxy groups; and preferably the number of carboxy groups exceeds the number of hydroxy groups.

The groups with which the carboxy groups are esterified contain preferably 1–7, especially 2–5 carbon atoms. In the ester molecule they can be the same or different. Preferably they are aliphatic. For thermal stability but biodegradability such aliphatic groups preferably have straight chains. If desired, a small portion of these groups are divalent, so as to give an oligomer suitably containing up to 3 repeating units.

The groups with which the hydroxy groups are esterified preferably contain 2–7, especially up to 4, carbon atoms, including the carbon atom of the carboxy of such groups. In the ester molecule such groups can be the same or different. Preferably they are aliphatic and, for thermal stability and biodegradability, have straight chains. If desired, a small proportion of these groups are divalent, so as to give an oligomer suitably containing up to 3 repeating units.

An example of such a plasticiser is Estaflex* (acetyltri-n-butyl citrate.

The polymer composition may contain any other of the additives commonly used in polymer processing, for example, pigment e.g. titanium dioxide, particulate or fibrous or platy filler e.g. talc.

The invention provides processes of shaping the composition and the resulting shaped articles. In particular the process comprises melting the composition at a temperature not higher than the crystalline melting point of PHA-Y, shaping said molten composition at a temperature between the crystalline melting points of PHA-X and PHA-Y, and allowing the composition to cool and crystallise. Alternatively the composition is made by melting a mixture of PHA-X and PHA-Y completely, holding it at a temperature at which at least part of the PHA-Y crystallises, then shaping it. By such holding the crystallisation time of the PHA-X is shorter than when shaping follows very soon after melting.

Processes for preparing shaped articles include for example, extrusion, production of film, coatings, injection moulding, thermoforming, fibre spinning and blow moulding.

The invention provides processes of shaping the polymer composition and the resulting shaped articles. The processes are mentioned above. Articles include fibres, films especially for packaging, coated products (such as paper, board, non-woven fabrics), fibres, non-woven fabrics, extruded nets, personal hygiene products, bottles and drinking vessels, agricultural and horticultural films and vessels, containers, disposable items such as ostomy bags, incontinence devices and wound care products, sustained release systems for drugs and agrochemicals and adhesives.

The invention is now particularly described by reference to the following examples which do not limit the scope of the invention.

EXAMPLE 1

Preparation of High Melting PHB

A batch of PHB homopolymer was prepared by the steps of:

(a) growth of A.eutrophus on glucose substrate;

(b) PHB accumulation by fermentation on glucose substrate in nitrogen starvation;

(c) separation of PHB granules by subjecting cells to heat shock, enzymic decomposition and centrifugation; spray drying the resulting aqueous slurry of PHB particles.

The resulting PHB had Mw 592,000 and $T_m$ 173.9° C. and was 54% crystalline. A sample (50 g) of the spray dried particles was placed in a vacuum oven preheated to 170° C. and held at that temperature and at a pressure of $0.2 \times 10^5$ Pa (0.2 bar) for 7 hours. The oven was allowed to cool while maintaining the vacuum.

The product had a crystalline melting point ($T_m$) of 180.5° C. and was 80% crystalline as measured by DSC. It was pale brown in colour, similar to that of lightly toasted white bread.

EXAMPLE 2

Use of High Melting PHB as Nucleant

Using a laboratory mixer, followed by passage through a "Betol" extruder, samples of PHBV copolymer (12 mol % V, crystalline melting point ($T_m$) of 149.9° C.) (300 g) were formulated with high melting PHB (1 and 5 phr). These and control samples were examined by DSC using a Perkin-Elmer DSC-4 instrument. The DSC specimens (10 mg each) were heated to melt temperature (various) at 100° C./min in a nitrogen atmosphere, and cooled to 20° C. at 20° C./min. Table 1 below shows the peak crystallisation temperature T cryst and heat of fusion $H_f$ for these samples. NB. phr is parts per hundred.

TABLE 1

| Nucleant | phr | Melt Temperature °C. | T Cryst, °C. | $\Delta H_f$ $Jh^{-1}$ |
|---|---|---|---|---|
| None | — | 170 | 74.7 | 41.9 |
| PHB (Ex 1) | 1 | 170 | 95.7 | 33.4 |
| PHB (Ex 1) | 5 | 170 | 100.4 | 38.8 |
| None | — | 180 | — | 0 |

TABLE 1-continued

| Nucleant | phr | Melt Temperature °C. | T Cryst, °C. | $\Delta H_f$ $Jh^{-1}$ |
|---|---|---|---|---|
| PHB (Ex 1) | 1 | 180 | 70.3 | 41.9 |
| PHB (Ex 1) | 5 | 180 | 88.7 | 45.7 |

The following conclusions are drawn:

Using melt temperature 170° C.:

1 the PHBV copolymer without an added nucleant is nucleated by self-seeding and thus shows a distinct peak crystallisation temperature.

2 the samples containing PHB as nucleant (Ex 1) at 1 and 5 phr show a substantially higher T cryst (higher by 21° C. and 25.7° C. respectively) than the sample without added nucleant.

Using melt temperature 180° C.:

1 the PHBV copolymer without added nucleant does not crystallise at all in the time available in DSC, and thus no T cryst or $H_f$ was observed. At 180° C. self-seeding is evidently negligible.

2 the samples containing PHB as added nucleant (Ex 1) did crystallise and gave T cryst and $H_f$ values in the region obtained for the examples carried out at the 170° C. melt temperature.

Thus, PHB at 1 and 5 phr is an effective nucleant and is substantially more effective than self-seeding. Furthermore, it has the advantage of being a biodegradable nucleant. A yet further advantage is that under practical circumstances in which the polymer composition would be cooled very rapidly and would normally experience slow crystallisation, the use of the present nucleant causes the polymer to crystallise more rapidly at low temperatures.

EXAMPLE 3

The nucleating effect of the heat-treated PHB (from Example 1) was demonstrated by isothermal peak time (tp) measurements using the following procedure:

melt at 180° C. (total 2 min heating);

cool at 200° C. $min^{-1}$ to 100° C.;

hold at 100° C. for 30 min;

record heat flow over the 30 min and note times taken until an inflection occurs in the time/heat flow curve (tp).

Measure area ($H_f$) under the curve on the low/high temperature side of the perpendicular at tp.

The following values of time were recorded in TABLE 2.

TABLE 2

| Polyester | Nucleant | tp. min |
|---|---|---|
| PHBV (4 mol % V, $T_m$ 169° C.) | none | 1.77 |
| PHBV (4 mol % V, $T_m$ 169° C.) | 5 phr heat treated PHB | 0.82 |

The tp. value is a measure of the rate of crystallisation thus, the shorter the time to the temperature peak the greater crystallinity developed in the sample at a given time after preparation. It is evident that the heat treated PHB has nucleated the sample of the PHBV to a substantial extent compared to the sample with no added nucleant, which may or may not have self-seeded. It is desirable to reduce the time for developing sufficient crystallinity as this reduces the processing time for the preparation of shaped articles.

EXAMPLE 4

Preparation of High Melting PHB 2.4 Kg of PHB powder ($T_m$=173.5° C.) was placed in an oven preheated to 170° C. After 3 hours the PHB had reached 170° C. and it was kept at that temperature for 100 minutes. The PHB was then cooled and pulverised to remove any agglomerates which had formed during the high temperature process. The crystalline melting point (Tm) of the heat-treated PHB was 182.6° C.

Blending and extrusion

Using a 100 liter mixer, 18 Kg of PHBV (8% HV content, $T_m$ of 158° C.) was weighed out and added to the mixture. Then 5 parts per hundred (phr) of the high melting PHB and 10 phr of a plasticiser (Estaflex ATC*) was added. The mixer was started on low speed and run for 1 minute. The mixture was then charged into a ZSK 30 extruder fitted with H19.2 screw and a twin lace die. A control sample was prepared at the same time containing 1 phr boron nitride instead of 5 phr of high melting PHB. The running conditions are given below. Where the control differs from the example, the conditions for the control sample are given in ( ).

Running conditions were as follows:

Extruder temperature: Zones 1 to 4=150° C.
Zone 5=160° C.
Die: 150° C. (160° C.)
Screw speed: 200 rpm
Feed rate: 22 Kg/hour (27.5 Kg/hour)
Filters: 60/100/60 mesh
Torque: 44% (50%)

Bottle Blow Moulding

Bottles were prepared by injection blow moulding using a Hesta HS451 with 45 mm diameter screw under the following conditions:

Barrel temperatures: 147° C./147° C./147° C.
Head temperature: 147° C.
Screw speed: 20 rpm
Actual melt temperature: 154° C.
blow pressure: 3 bar
blow time: 20 seconds
cycle time: 21 seconds
mould temperature: 50° C.
Blow pin temperature: 50° C.

The cycle time is the time required for the polymer to achieve the level of crystallinity required to enable the shaped object to be removed from the mould without deformation. It is notable that the cycle time of both the example and the control polymers was exactly the same indicating that each had developed identical or very similar levels of crystallinity within the same time.

Bottle Impact Behaviour

The bottles were stored at 28° C. for 4 weeks and then filled to capacity with 200 ml water. The bottle drop impact performance was assessed by the following method. The bottles were filled with water and left for 24 hours in a constant temperature (22° C.) and humidity room. A minimum of 10 bottles were dropped vertically onto a concrete slab angled 5 degrees up from the horizontal. The bottles were drop tested in the constant temperature/humidity room under the same conditions.

Results

At 3 months 100% of the bottles prepared from PHBV containing 5 phr of high melting PHB survived a drop from 36 inches. At 3 months 100% of the bottles prepared from PHBV containing 1 phr of boron nitride survived a drop from 36 inches. This result indicates that the mechanical properties of PHBV are equivalent (after 3 months) with either high melting PHB or boron nitride as nucleant. Thus, high temperature annealed PHA-Y is a useful and effective alternative to nucleants such as boron nitride.

I claim:

1. Process for making, by a melt cast shaping method selected from the group consisting of extrusion, production of film, coating, injection moulding, thermoforming, fibre spinning and blow moulding, a shaped article at least partly composed of crystallised microbiologically produced polyhydroxyalkanoate, characterised by:

(a) forming a mixture of a first polyhydroxyalkanoate (PHA-X) with a second polyhydroxyalkanoate (PHA-Y), said PHA-Y having a crystalline melting point (Tm) at least 5° C. higher than that of said PHA-X and being present in a nucleating proportion in the range 0.1 to 20% w/w; and (b) shaping the mixture at a temperature between the crystalline melting points of said PHA-X and said PHA-Y.

2. Process according to claim 1 in which the crystalline melting point of PHA-Y is higher than that of PHA-X by 10° to 50° C.

3. Process according to claim 1 in which the PHA-Y is provided as particles in the size range 5 to 500 μm.

4. Process according to claim 1 in which PHA-X is poly-3-hydroxybutyrate-co-valerate containing 4–20 mol % of valerate units.

5. Process according to claim 1 in which PHA-Y is poly-3-hydroxybutyrate homopolymer or copolymer containing less than 2 mol % of units other than 3-hydroxybutyrate.

6. Process according to claim 1 including as a preliminary step providing the PHA-Y ingredient of the mixture by recovering it from microorganism cells by procedures not involving treatment at temperatures over (Tm minus 20)° C. and annealing it to a crystalline melting point higher by at least 3° C. than before annealing.

7. Process according to claim 1 in which said annealing is to a crystalline melting point higher by 3° to 15° C. than before annealing and is carried out at a temperature 1° to 10° C. below the crystalline melting point of the PHA-Y ingredient.

8. Process according to claim 1 in which PHA-Y is poly-3-hydroxybutyrate having a crystalline melting point in the range 180°–183° C.

9. Process according to claim 1 in which the mixture is made by melting the ingredients at a temperature not higher than the crystalline melting point of PHA-Y or by melting a mixture of PHA-X and PHA-Y completely, then holding it at a temperature at which at least part of the PHA-Y crystallises.

10. Process according to claim 1 in which the shaping method is injection blow moulding and the shaped article is a bottle.

* * * * *